United States Patent
Weirauch et al.

(10) Patent No.: US 8,752,198 B2
(45) Date of Patent: Jun. 10, 2014

(54) VIRTUAL WRITE PROTECTION SYSTEM

(75) Inventors: Charles R. Weirauch, Loveland, CO (US); Sung-hee Hwang, Seoul (KR); Kyung-geun Lee, Seongnam-si (KR)

(73) Assignees: Hewlett-Packard Development Company, L.P., Houston, TX (US); Samsung Electronics Company, Ltd, Gyeonggi-Do (KR)

( * ) Notice: Subject to any disclaimer, the term of this patent is extended or adjusted under 35 U.S.C. 154(b) by 1367 days.

(21) Appl. No.: 11/234,483

(22) Filed: Sep. 23, 2005

(65) Prior Publication Data

US 2006/0280068 A1    Dec. 14, 2006

Related U.S. Application Data

(60) Provisional application No. 60/685,329, filed on May 26, 2005.

(51) Int. Cl.
*G06F 21/00* (2013.01)

(52) U.S. Cl.
USPC ............................. 726/28; 713/183; 713/193

(58) Field of Classification Search
None
See application file for complete search history.

(56) References Cited

U.S. PATENT DOCUMENTS

| | | | |
|---|---|---|---|
| 5,233,576 A * | 8/1993 | Curtis et al. | 369/13.02 |
| 5,428,598 A * | 6/1995 | Veldhuis et al. | 369/275.3 |
| 6,044,046 A * | 3/2000 | Diezmann et al. | 369/14 |
| 6,590,845 B2 * | 7/2003 | Geeslin | 369/53.21 |
| 6,621,768 B1 | 9/2003 | Keller et al. | |
| 6,717,899 B1 * | 4/2004 | Carson et al. | 369/59.23 |
| 6,724,705 B1 * | 4/2004 | Ko et al. | 369/53.21 |
| 7,165,267 B1 * | 1/2007 | Utsumi et al. | 726/2 |
| 7,173,892 B2 | 2/2007 | Kaneko | |
| 7,302,581 B2 | 11/2007 | Utsumi | |
| 2003/0191952 A1 * | 10/2003 | Anderson et al. | 713/189 |
| 2005/0244006 A1 * | 11/2005 | Bruekers et al. | 380/228 |
| 2005/0251481 A1 * | 11/2005 | Linnartz | 705/51 |

FOREIGN PATENT DOCUMENTS

| | | |
|---|---|---|
| CN | 1320917 A | 11/2001 |
| EP | 0945775 A2 | 9/1999 |
| JP | 11-265544 A | 9/1999 |
| JP | 2000-036161 A | 2/2000 |
| JP | 2000222811 | 11/2000 |
| KR | 10-2001-0037452 A | 5/2001 |
| RU | 2002116401 A | 3/2004 |
| TW | 200416674 A | 9/2004 |
| WO | 03105137 A1 | 12/2003 |

OTHER PUBLICATIONS

AU Application No. 2006249793, Office Action mailed on Feb. 16, 2010, 2 pages.
EP Application No. 06784477.9, Office Action mailed on Sep. 3, 2008, 2 pages.
International Application No. PCT/US2006/020369, International Preliminary Report on Patentability mailed on Nov. 30, 2007, 8 pages.

(Continued)

*Primary Examiner* — Michael R Vaughn

(57) ABSTRACT

An optical medium containing virtual write protect information can be recorded in drives and systems without first changing the write protection from on to off by receiving valid user input The virtual write protection may also be enabled or disabled by additional information on the disc.

4 Claims, 4 Drawing Sheets

(56) References Cited

OTHER PUBLICATIONS

International Application No. PCT/US2006/020369, International Search Report and Written Opinion mailed on Sep. 28, 2006, 9 pages.

RU Application No. 2007148903, Office Action mailed on Jun. 8, 2010, 3 pages.
RU Application No. 2007148903, Decision on Grant mailed on Oct. 28, 2010, 4 pages.

* cited by examiner

VIRTUAL WRITE PROTECTION SYSTEM

CROSS-REFERENCE TO RELATED APPLICATION

This application claims the benefit of U.S. Provisional Application Ser. No. 60/685,329, filed May 26, 2005 and entitled "Virtual Write Protection System", which is also hereby incorporated by reference herein in its entirety.

BACKGROUND

Technical Field

The invention relates generally to optical media used for information storage, and drives for recording optical media used for information storage.

Digital optical media are used for a variety of purposes and a variety of information, for example, entertainment data, such as audio and video, and computer data, such as text files and numerical data files. In many instances it is desirable to protect the recorded data from intentional or accidental overwriting. For preventing this, optical media typically includes a bit to indicate the media is write protected or in the case where the disc is in a cartridge or media carrier with a tab or other mechanical switch in the cartridge or carrier. In the case of a write protect bit on the media, the state of the bit must be changed before writing can occur. Unfortunately, some optical media allows only a limited number of overwrites or in the case of write-once media no overwrite. In the case of rewritable media with a limited number of overwrites, the information recorded in an area with too many overwrite becomes unreliable, while write-once media requires reserving a large area to accommodate the likely number of changes to the write protect bit. There is an ongoing need for a write protection system that takes into account the limitations of some media that allow limited or no overwrites.

DESCRIPTION

For some digital optical media for information storage, for example some Compact Discs (CD's), Digital Versatile Discs (DVD's), and blue laser formats (HD-DVD's and Blu-ray), each data surface has a land and groove structure, with lands and/or grooves. User information (for example, audio data, video data, or computer data) may be recorded in the grooves, on the lands, or both. The disc may be divided into regions used to record user data and a different region used to record other non-user forms of data including control or format data, etc. Either form of data is usually recorded according to its smallest recordable unit that includes both the normal data plus error correction information, addressing information, etc, typically referred to as an ECC block, for example DVD's have the smallest recording unit as 37,856 bytes of which 32,768 bytes are the normal or user data portions of the ECC block. Because the minimum recording unit is so large, it typically includes additional and often critical information beyond the information used to indicate write protection on the disc. Rewriting a particular ECC block an excessive number of times will cause the ECC block to eventually become difficult to read causing critical information to be lost.

In example embodiments of the invention, all of the write protection information may not need to be changed before allowing recording to the other areas of the disc. This is allowed after confirmation of the user at some point in time essentially making the write protection a virtual feature that does not require changing the actual bits on the disc. Having a virtual bit means you do not have to change the physical write protect bit of the disc before writing to the disc. Without the virtual bit, you must change the physical write protect bit. In a first example, the write protection system uses a single item of information to indicate the write protection status such that the single item of information has an inherent virtual nature. In a second example, there is additional information to indicate that the write protection information is virtual or not. In a third example, a password function is included to control changing of information.

Figure 1:
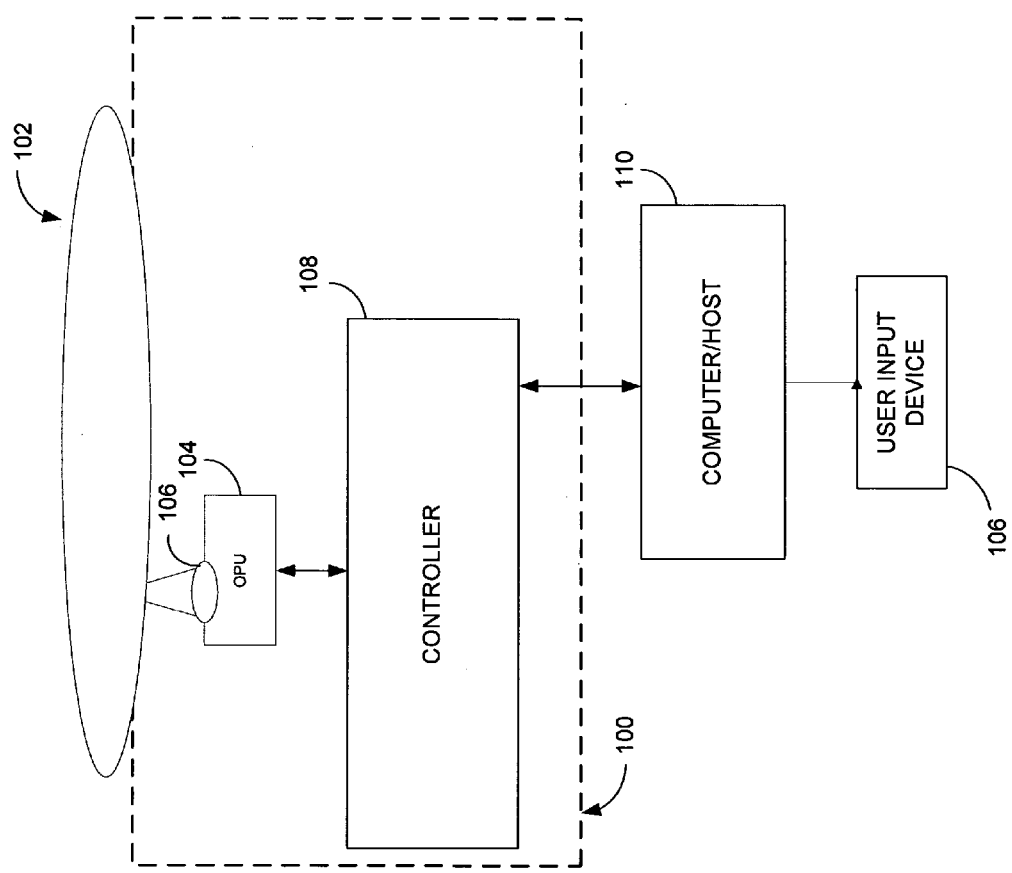
FIG. 1 illustrates an example system in which the invention may be implemented.

FIG. 1 illustrates an example embodiment of a system including a drive 100, an optical disc 102, and an user input device 106. An optical head 104 reads and write data on the disc 102 through a lens system 106. A controller 108 transforms signals from the optical head 104 into digital information. The digital information includes user data and non-user data. The controller 108 is in communication with a host device 110. The drive 100 may be part of the host 110, or optionally the drive may be a peripheral device connected to the host by a cable as illustrated, or optionally the drive may be a peripheral device and communicate with the host wirelessly. The host 110 including a drive 100 may be a computer or other devices including optical disc recorders that record video programming. The user input device 106 may be a keyboard or remote control device.

Figure 2B:
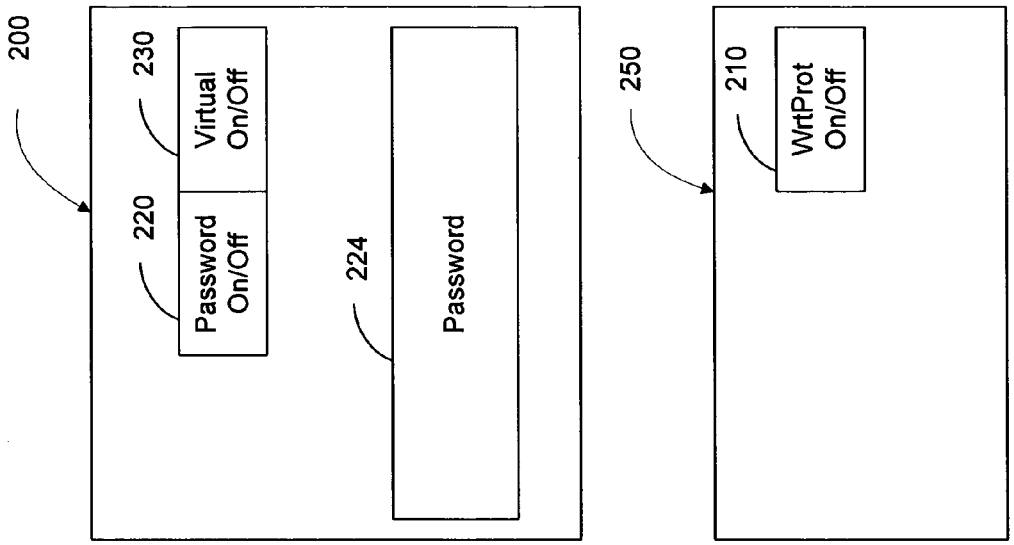
FIG. 2B illustrates an example system containing multiple pieces of write protection information contained in multiple data structures including one piece of information to indicate an allowed virtual status, a different piece of information to indicate an write protect ON/OFF, information to indicate the presence of a password and a password recorded on a disc in the system of FIG. 1.
Figure 2A:
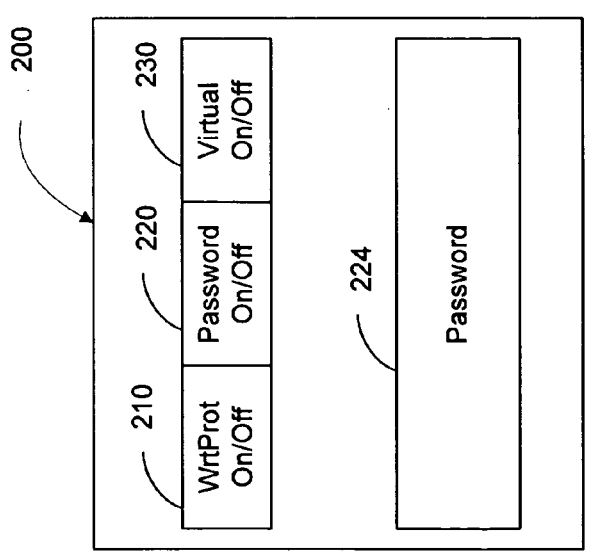
FIG. 2A illustrates an example system containing multiple pieces of write protection information contained within a single data structure including one piece of information to indicate an allowed virtual status, a different piece of information to indicate an write protect ON/OFF, information to indicate the presence of a password and a password recorded on a disc in the system of FIG. 1.

FIG. 2A illustrates a data structure 200 containing write protection information on the disc 102. In the example of FIG. 2A, the write protection information consists of a write protection On/Off information 210, a password On/Off information 220, a password 224 and a virtual On/Off information 230. In various embodiments, some of these elements may not be present. For example, the system may not use a password thereby omitting the password On/Off information 220 and a password 224. Or the write protection On/Off 210 may always be considered virtual and does not need to be physically changed on the media prior to recording on the disc. In this case, there is no need for virtual On/Off information 230. When the user attempts to write to the disc or at some point after inserting the disc into the drive or device, the system must request confirmation and only after receiving the confirmation may the disc be recorded. The confirmation may occur immediately before attempting to write or at time or some earlier time, such as when the system has successful determined the state of the write protection indicator 210.

Further, the user may set the drive, software or device to not request the confirmation for this disc or any disc. This can be accomplished by saving a setting on the optical disc 102 or in the drive, software FIG. 2B illustrates a variation of FIG. 2A, except that the write protection On/Off information 210 is contained in a separate data structure 250. Other embodiments may have different information recorded in one or more separate data structures 250.

Figure 3B:
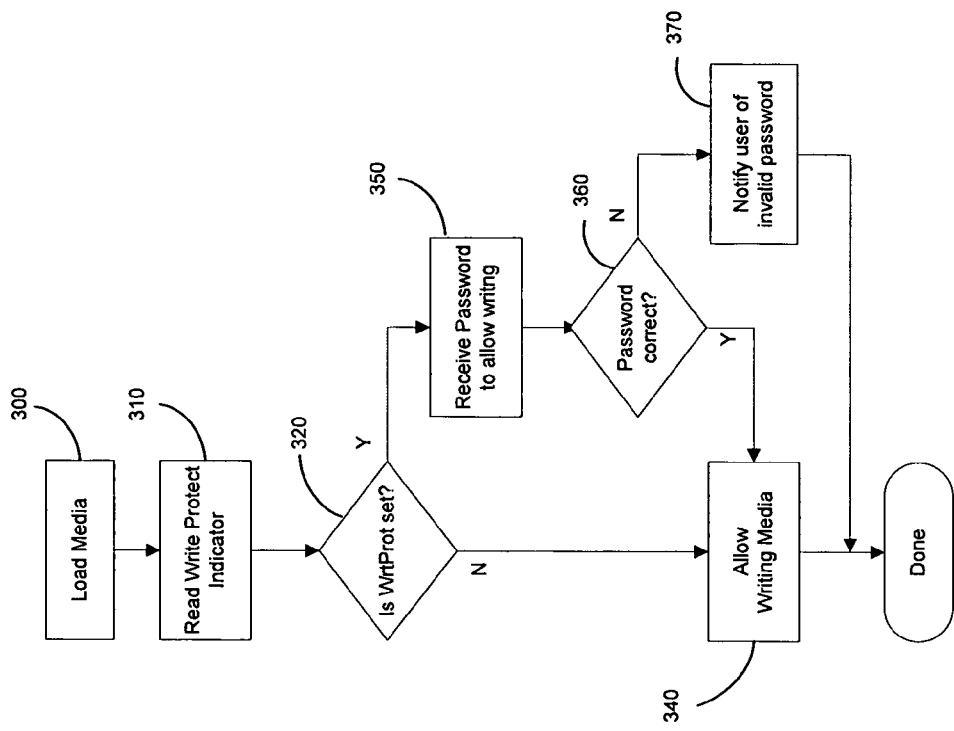
FIG. 3B is a flow chart of an example embodiment of a method for using the write protect system of FIG. 2A in which there is write protect On/Off information and includes password control.
Figure 3A:
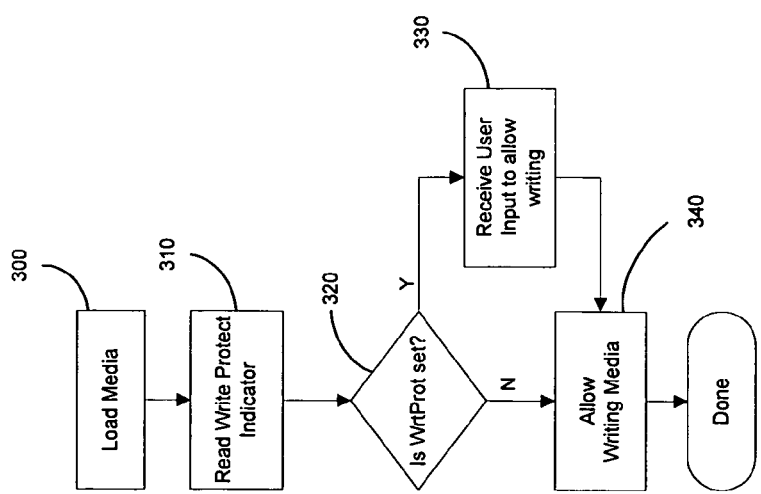
FIG. 3A is a flow chart of an example embodiment of a method for using the write protect system of FIG. 2A in which there is only the write protect On/Off information.

FIG. 3A is a flow chart of an example embodiment of a method for using the write protect system of FIG. 2A in which there is only the write protect On/Off information for a representative situation when the system receives a request to write to the media from an end-user. Block 300 starts with loading media into the present system. The media could be any such digital optical media such as CD's, DVD's, one of the blue-laser formats (HD-DVD and Blu-ray), or other similar optical media Block 310 collects the read/write protect indicator that is stored on the media loaded in block 300. Decisional block 320 determines whether the WrtProt bit is set. If YES, control is passed to block 330 to allow the system to receive user input to permit writing before passing control to block 320. If the WrtProt bit is not set, the decisional block 320 passes control to block 340 to perform write media.

FIG. 3B illustrates a flow chart of an example embodiment of a method for using the write protect system of FIG. 2A in which there is write protect On/Off information and includes password control. Block 300 starts with loading media into the present system. Block 310 collects the read/write protect indicator that is stored on the media loaded in block 300. Decisional block 320 determines whether the WrtProt bit is set. If yes, control is passed to block 350, which requires the additional step of accepting a password from the user before writing to the disc is permitted. Decisional block 360 determines whether the password entered by the user is correct. If the password is correct, control is passed to block 340 to perform write media. If the password entered is incorrect, the user is notified (block 370) before control is passed to block 340. If the WrtProt bit is not set, decisional block 320 passes control to block 340 to perform write media.

Figures 4A, 4B:
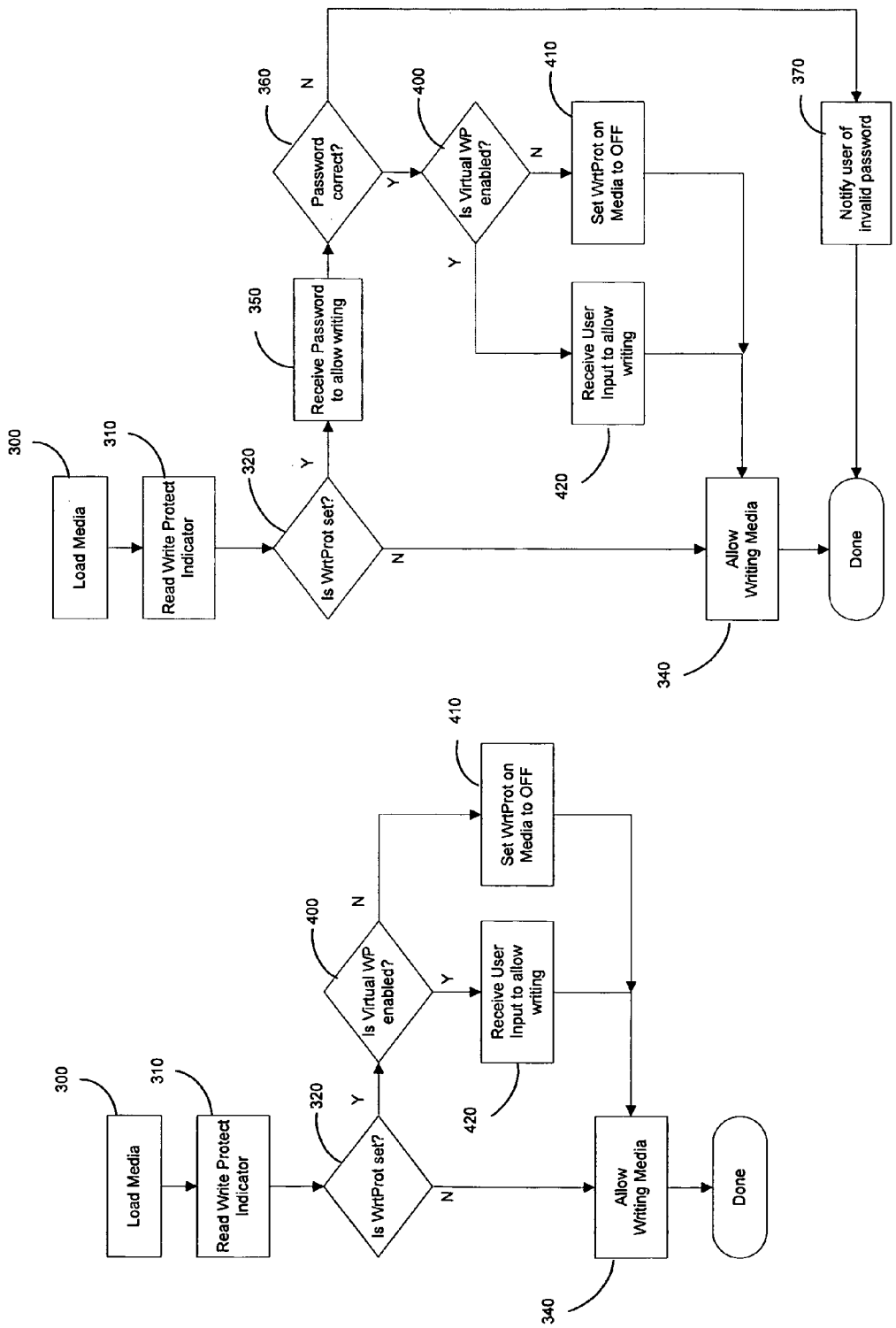
FIG. 4A is a flow chart of a second example embodiment of a method for using the write protect system of FIG. 2A or 2B without the Virtual On/Off.
FIG. 4B is a flow chart of an example embodiment of a method for using the complete write protect system of FIG. 2A or 2B.

FIG. 4A illustrates a flow chart of a second example embodiment of a method for using the write protect system of FIG. 2A or 2B with the Virtual On/Off. Block 300 starts with loading media into the present system. Block 310 collects the read/write protect indicator that is stored on the media loaded in block 300. Decisional block 320 determines whether the WrtProt bit is set. If yes, control is passed to decisional block 400 to determine whether the Virtual Write Protect bit is set. If no, control is passed to block 420 to allow the system to receive user input to permit writing before control is passed to block 340. If the Virtual Write Protect bit is not set, the control is passed to block 410 to turn off the WrtProt bit. If the WrtProt bit is set, decisional block 320 passes control to block 340 to perform write media.

FIG. 4B illustrates a flow chart of an example embodiment of a robust method for using the complete write protect system of FIG. 2A or 2B. Block 300 starts with loading media into the present system. Block 310 collects the read/write protect indicator that is stored on the media loaded in block 300. Decisional block 320 determines whether the WrtProt bit is set. If yes, control is passed to block 350, which requires the additional step of accepting a password from the user before writing to the disc is permitted. Decisional block 360 determines whether the password entered by the user is correct. If the password entered is incorrect, the user is notified (block 370). If the password is correct, control is passed to decisional block 400 to determine whether the Virtual Write Protect bit is set. If yes, control is passed to block 420 to allow the system to receive user input to permit writing before control is passed to block 340. If the Virtual Write Protect bit is not set, the control is passed to block 410 to turn off the WrtProt bit If the WrtProt bit is set, decisional block 320 passes control to block 340 to perform write media.

While the present invention has been illustrated and described in connection with the preferred embodiments, it is not to be limited to the particular structure shown. It should be understood by those skilled in the art that various changes and modifications may be made within the purview of the appended claims without departing from the true scope and spirit of the invention in its broader aspects.

What is claimed is:

1. A method of recording on a medium without modifying write protection on said media comprising:
   collecting a write protection indicator from the medium that is loaded onto a drive;
   determining whether the write protection indicator is set indicative of the medium being write protected;
   based on the write protection indicator being set, determining whether a user password is required by the drive;
   receiving a user password from a user if the user password is determined to be required;
   verifying the user password;
   based on the user password being successfully verified, collecting a virtual protection indicator from the medium;
   determining whether the virtual write protect indicator on the medium is set indicative of virtual write protection for the medium;
   receiving user input to allow recording to the medium if the virtual write protection indicator is set; and
   recording to the medium based on the write protection indicator being set, the user password being verified, the virtual write protection indicator being set, and the user input being received.

2. The method of claim 1 wherein the virtual protection indicator specifies, in a first state, whether to receive the user input to allow recording to the medium or, in a second state, whether a state of the write protection indicator should be changed.

3. A drive for a recordable medium, comprising:
   a controller that:
      determines whether a write protection indicator is set on the medium indicative of the medium being write protected;
      based on the write protection indicator being set, the controller determines whether a user password is required by the drive and receives a user password from a user if the user password is determined to be required and verifies the user password;
      based on the user password being successfully verified, the controller collects a virtual protector indicator from the medium and determines whether the virtual write protection indicator is set indicative of virtual write protection for the medium;

based on the virtual write protection indicator being set, the controller receives user input to allow recording of the medium; and causes the medium to be recorded to based on the user input being received, the write protection indicator being set, the user password being verified, and the virtual write protection indicator being set.

4. The drive of claim 3 wherein the virtual protection indicator specifies, in a first state, whether to receive the user input to allow recording to the medium or, in a second state, whether a state of the write protection indicator should be changed.

* * * * *